United States Patent [19]

Moon

[11] Patent Number: 5,766,337

[45] Date of Patent: Jun. 16, 1998

[54] MAGNESIUM OXYPHOSPHATE CEMENT

[76] Inventor: Leonard H. Moon, 401 Woodworth Ave., Missoula, Mont. 59801-6046

[21] Appl. No.: 753,412

[22] Filed: Nov. 25, 1996

[51] Int. Cl.[6] ............................................. C04B 12/02
[52] U.S. Cl. ........................ 106/690; 106/691; 106/801; 501/111
[58] Field of Search .................... 106/690, 691, 106/801; 501/111

[56] References Cited

U.S. PATENT DOCUMENTS

| | | |
|---|---|---|
| 3,879,209 | 4/1975 | Limes et al. .................. 106/690 |
| 3,960,580 | 6/1976 | Stierli et al. .................. 106/690 |
| 4,059,455 | 11/1977 | Limes et al. .................. 106/690 |
| 4,836,854 | 6/1989 | Bierman et al. ............... 106/691 |
| 5,518,541 | 5/1996 | Fogel et al. .................. 106/691 |

*Primary Examiner*—Michael Marcheschi
*Attorney, Agent, or Firm*—Kolisch, Hartwell, Dickinson, McCormack & Heuser

[57] ABSTRACT

The preparation of a phosphate-bonded magnesia cement from mixtures of magnesium oxide and an aqueous solution of ammonium polyphosphate, where the mixtures further include a solid monoammonium phosphate fraction that functions to prevent undesired ammonia emission during setting up of the mixtures to produce hardened concrete.

3 Claims, No Drawings

MAGNESIUM OXYPHOSPHATE CEMENT

BACKGROUND AND SUMMARY OF THE INVENTION

The present invention relates to phosphate-bonded magnesia cement products produced by reacting mixtures containing aqueous ammonium polyphosphate with magnesium oxide. Phosphate-bonded magnesia cements are notable in that they may be prepared to have relatively short skinning and setting times, allowing these cements to be used in applications where quick hardening is desirable, without the cement moving from its supplied position.

In one approach to preparing phosphate-bonded magnesia cements, the ammonium phosphate utilized in the manufacture is provided as an aqueous solution of polyphosphate, prepared utilizing technologies known in the fertilizer art. Further explaining, a 10-34-0 composition having ammonium phosphate fully dissolved into solution and also having a large proportion of the phosphate present as polyphosphates is widely available commercially as a fertilizer material, and is also widely used commercially in the production of phosphate-bonded magnesia cements. The liquid fertilizer is mixed with solid magnesium oxide, i.e., magnesia, and optionally desired fillers and/or other ingredients, and then applied to the form or surface where hardening is to take place. Setting may occur within a few minutes after application. In this discussion, the "N-P-K" shorthand notation for fertilizer composition will be used, with the N denoting the percent by weight of ammoniacal nitrogen, the P denoting the percentage-by-weight of phosphorous expressed as $P_2O_5$, and the K denoting the potassium content in weight by percent.

Short skinning and setting times of magnesia cements are desirable and even necessary in some applications, but in other applications, longer setting and skinning times are appropriate. Thus, a problem encountered with these cements is controlling the setting time to coincide with the selected setting time desired. It has also been observed that there may a large degree of variation in the skinning and setting times of different phosphate-bonded magnesia cements, arising by reason of the variables involved in the manufacture of an ammonium phosphate fertilizer material.

Another problem that has been encountered in the manufacture of magnesia cement products has been the excessively large ammonia emissions that are experienced during these setting up or hardening of the compositions producing the cement. Phosphate-bonded magnesia cements have utility in the manufacture of such articles as shingles or shakes, or outdoor building products, with fire-resistant properties. But large ammonia emissions during the setting up of these cements prevents their use except in installations where adequate provision has been made for circulating air in the immediate environment, and for scrubbing the air to remove the ammonia contained therein. This obviously is a major economic factor curtailing the use of magnesia cements in a number of important applications.

An object of the invention, therefore, is to provide improved formulations for the production of phosphate-bonded magnesia cements, which make possible the production of hardened products from a settable mixture with little or no observable ammonia emission during the setting or hardening process.

Another object is to provide improved phosphate-bonded magnesia cement products, preparable from cement forming compositions that evidence little or no ammonia emission during the setting up process.

Yet a further object is to provide an easy and reliable manner for producing cement forming compositions of this nature, i.e., compositions characterized by minimal ammonia emission during the setting up process. Another feature of the invention is that along with control of ammonia emissions, skinning and setting up times are also controlled, to produce a lengthening in these times and uniformity in the times obtainable.

These and various other objects and advantages are obtained by the invention, which is described hereinbelow in conjunction with specific examples.

DETAILED DESCRIPTION OF THE PREFERRED EMBODIMENT

Preferred embodiments of the present invention will be described in relation to a commercially preferred approach for manufacturing phosphate-bonded magnesia cements. As described in U.S. Pat. Nos. 3,879,209 and 4,059,455 (whose disclosures are herein incorporated by reference), phosphate-bonded magnesia cements are commonly prepared by combining an aqueous ammonium phosphate solution with magnesium oxide. Further additions of inert particulates, such as fibers, rock, sand, brick, minerals or sized minerals, produce concrete. As disclosed in column 5 of U.S. Pat. No. 3,879,209, a preferred ammonium phosphate containing chemical is an agricultural fertilizer grade aqueous solution having a nominal analysis of 10-34-0.

Aqueous ammonium phosphate solutions useful in the manufacture of phosphate-bonded magnesia cements may be prepared by a variety of techniques, known to those skilled in the art, such as, for example, the reaction of polyphosphoric acid with concentrated ammonium hydroxide, or the reaction of supeiphosphoric acid with ammonia in a pipe reactor. The polyphosphoric acid can be represented by the formula:

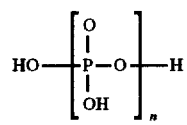

When n equals 1, the formula represents orthophosphoric acid. When 17 equals 2 or more, the formula represents a polyphosphoric acid, such as a pyrophosphoric acid (n equals 2), tripolyphosphoric acid (n equals 3) o r tetrapolyphosphoric acid (n equals 4).

When such polyphosphoric acids are reacted with ammonia, some of the hydroxy groups of the formula are converted to the —$ONH_4$ radical. Where one such conversion occurs per molecule, the resulting product is known as monoammonium polyphosphate, and where two such conversions occur, the resulting product is known as diammonium polyphosphate.

As discussed in U.S. Pat. No. 4,836,854, considerable variations may be expected in setting time, and properties, of phosphate-bonded magnesia cement resulting from the use of commercially purchased 10-34-0 fertilizer compositions. Such variations can occur from manufacture to manufacturer, and even between different batches of product produced by the same manufacturer. The variations of the 10-34-0 fertilizer products, and the resulting magnesia cements, are not unexpected, inasmuch as the 10-34-0 compositions are prepared primarily to meet fertilizer compositional standards, rather then standards relating to manufacture of cements. Further contributing to variability in the setting time in the production of phosphate-bonded magnesia cements utilizing commercial fertilizers, is that polyphosphate content may change over time due to reactions in the stored product. All of these factors have contributed to difficulties in maintaining desired uniformity of setting time in the production of cements utilizing as a principal constituent commercially available fertilizers.

In U.S. Pat. No. 4,836,854, there is disclosed a process for preparing a phosphate-bonded magnesia cement which uses, in addition to an aqueous solution containing ammonia and polyphosphate (such as the commercial available 10-34-0 fertilizer), a second component consisting essentially of a solid phosphate in the form of a finely divided solid. In addition to the aqueous solution containing the polyphosphate, and the second phosphate-containing component consisting of the solid phosphate, a cement-forming mixture is prepared by further including magnesium oxide as a third component, and if desired, a fourth component, in the form of fillers, colorants, inerts, etc. By including a solid ammonium phosphate constituent, uniform setting times of an extended type are obtained, utilizing fertilizer grade of aqueous solutions containing polyphosphates.

Further explaining a typical manufacture, as contemplated by U.S. Pat. No. 4,836,854, which includes a solid phosphate for the purpose of obtaining uniformity in extended setting times, a first component may be used in the production of a cement, which typically is a major portion of the reactant of the cement composition, and is preferably an ammonium phosphate solution, such as that prepared for fertilizer applications, including, for example, the widely available 10-34-0 and 11-37-0 compositions. This first component is an aqueous solution, with all the ammonium phosphate in solution. Within the constraint of this limitation, the first component may very widely in composition and character, and it is a principal advantage of the procedure set forth in U.S. Pat. No. 4,836,854 that such varying first components may be utilized to produce a phosphate-bonded magnesia cement having relatively uniform predictable setting times when mixed in accordance with the steps set forth in that patent.

The second component which is mixed with the first component to produce the magnesia cement is essentially a solid ammonium phosphate. Described in the patent as a second component, is a fertilizer known as an 18-46-0 composition, which is essentially an orthophosphate containing some monoammonium phosphate but at least about 50 percent diammonium phosphate.

U.S. Pat. No. 4,836,854, in addition to the aqueous solution of polyphosphate, and the solid diammonium phosphate portion, describes a third constituent of the cement formulation as an appropriate amount of magnesium oxide, such as dead, burned magnesia. The magnesium oxide typically is present in an amount of at least about 25 percent by weight of the three components. After the reactant and the magnesium oxide are mixed together, the mixture may be applied to a surface or placed in a form within the period of the working time, and during which time the mixture remains substantially flowable and unhardened. Once the period for working has passed, the chemical reaction between the components continues until the cement is fully hardened. This period of time after the initial mixing to the hardening is denoted as the setting time. Described in the embodiment utilizing 10-34-0 and 18-46-0 reactants, is a setting time of about 12 to 13 minutes.

In addition to the aqueous solution of polyphosphate, and the solid diammonium phosphate, and the magnesium oxide constituent, the cement forming composition may include, if desired, relatively inert materials, or special purpose additives, mixed into the mixture to produce cements having special properties, or mortars, or concretes, as desired. Inert materials to produce mortars or concrete can include fibers, sand, gravel, diatomaceous earth, perlite, crushed brick, finely divided minerals and other materials.

In U.S. Pat. No. 4,836,854, the solid constituent, which may be 18-46-0 fertilizer, having at least about 50 percent diammonium phosphate, is described and claimed as present in an amount ranging from about 0.1 to about 10 percent by weight of the total weight of the phosphate ingredients in the concrete mixture. The patent recognizes that solid phosphate contents greater than about 10 percent are not preferred, inasmuch as the change in setting time procured by such an amount is not significant toward the ends sought to be obtained, which is obtaining stabilize setting times utilizing commercial grade fertilizers as starting materials.

The problem that has been experienced utilizing procedures as set forth in U.S. Pat. No. 4,836,854, and utilizing procedures known to date, is that the production of cements using phosphate-bonded magnesia formulations is accompanied, during the setting up process, with the evolution of substantial amounts of ammonia from the reaction mixture. The reaction to form a solid cement proceeds with the mixing together of the phosphate material and the magnesium oxide or magnesia, with ammonia emissions then occurring which are extremely troublesome when environmental factors are to be considered. Explaining a specific and particular problem, phosphate-bonded magnesia cements have been found to be useful in the production of building components such as shingles or shakes, because of physical characteristics obtainable in such product. The manufacture of shakes, however, might take place in a closed manufacturing facility, dictating the use of ammonia collectors and scrubbers to effectively remove the emitted ammonia from the immediate atmosphere. Providing such apparatus is reflected in substantially increased cost in the manufacture of the product.

This invention is based on the observation that a substantial reduction in ammonia emissions, which is to say emissions evaluated at 10 percent or less of the emissions encountered with normal operating procedures, is obtainable when a solid orthophosphate is used as an ingredient in the phosphate-bonded magnesia cement formulation, in amounts ranging from 30 to 100 percent of the weight of the aqueous solution of polyphosphate in the concrete formulation, and wherein the orthophosphate which is selected is a monoammonium phosphate with 60 percent or more on a weight basis of the phosphate constituent being monoammonium phosphate. Such monoammonium phosphate materials are obtainable as fertilizers, and exemplary of such solid phosphate material are the 10-49-0 fertilizer containing 75 percent monoammonium phosphate obtainable from IMC Agrico, and the 11-52-0 fertilizer obtainable from Aggrium, containing in excess 60 percent monoammonium phosphate. Both of these monoammonium phosphate materials are free-flowing granular materials.

With use of such relatively large amounts of monoammonium phosphate solid, hardening times may be extended and stabilized in the concrete formulations. Additionally, however, a very important advantage is achieved, which is substantial elimination of ammonia emission during the setting up process.

The exact chemical reaction which is occurring in phosphate-bonded magnesia cement formulations is not entirely understood. However, it appears that ammonia which is produced during the solidification which occurs with chemical reaction of the aqueous polyphosphate is neutralized by the presence of the monoammonium phosphate which is also known as ammonium acid phosphate. The monoammonium phosphate reacts with the free ammonia to produce diammonium phosphate, with reduction of ammonia emissions.

Commercially available 11-52-0 fertilizer is available in pill form. For optimum results, it is desirable to reduce any solid monoammonium phosphate to a finely ground consistency, such as to a mesh of 325 or finer.

Explaining the manufacture of cements following the present invention, commercially available magnesium oxide is a dry, granular material. And, as earlier explained, monoammonium phosphate is a dry, solid material also producable as a free-flowing granular substance. It is convenient in preparing dry materials, such as the magnesium oxide, and the monoammonium phosphate and any filler or inert material as a dry mix. This dry mix, which is easily prepared and stable, may then be mixed with an aqueous solution of ammonium polyphosphate, to produce the reaction mixture that forms the concrete.

Following the invention, the amount of magnesium oxide in the dry mix preferably ranges from about 80 to about 120 percent of the weight of the solid orthophosphate.

Describing a particular preparation, a dry mix was prepared employing equal parts of magnesium oxide, ground 11-52-0 fertilizer (ammonium monophosphate), and fly ash (the inert material). A reaction mixture was then prepared, with mixing together of two parts of the dry mix as above described, with one part of aqueous solution of ammonium polyphosphate (10-34-0 fertilizer). With mixing of these two ingredients, an exothermic chemical reaction took place, producing over time a cement-like inorganic polymer. A hard stable product was formed in approximately 45 minutes. Very importantly, following the above procedure, essentially no ammonia emissions were noted during the setting up process.

In another preparation, a dry mix was prepared with mixing together of one part magnesium oxide, one part monoammonium phosphate (11-52-0 fertilizer), and three parts fly ash. When two parts of the aforementioned dry mix, and one part aqueous ammonia polyphosphate (10-34-0 fertilizer) were mixed together, again an exothermic reaction was noted producing and after approximately 45 minutes, a stable hard product. As in the first preparation, essentially no ammonia was detected as an emission.

Particular embodiments of the invention have been described in detail for purposes of illustration. It should be obvious that variations and modifications are possible without departing from the invention and such variations and modifications are incorporated herein.

I claim:

1. A process for making a phosphate-bonded magnesia cement product comprising the steps of:

preparing a mixture containing (a) an aqueous source of soluble ammonium and phosphate wherein the phosphate is a polyphosphate, (b) a solid orthophosphate containing at least about 60 percent by weight monoammonium phosphate, and (c) magnesium oxide, the solid orthophosphate being present in an amount ranging from about 30 to 100 percent of the weight of the aqueous source of soluble ammonium and phosphate, reacting the mixture to produce the cement product, the monoammonium phosphate in the solid orthophosphate being effective to eliminate ammonia evolution during reaction of the mixture.

2. A process for making a cement product from a phosphate-containing ingredient and magnesium oxide, comprising the steps of:

preparing a dry mix of magnesium oxide and a solid orthophosphate containing at least about 60 percent by weight monoammonium phosphate, and incorporating with said dry mix an aqueous source of soluble ammonium and phosphate wherein the phosphate is a polyphosphate to produce a reaction mixture, the solid orthophosphate being present in an amount ranging from 30 to 100 percent of the weight of the aqueous source of soluble ammonium and phosphate, reacting the reaction mixture, the monoammonium phosphate in the solid orthophosphate being effective to eliminate evolution of ammonia during reaction of the mixture.

3. The process of claim 2 wherein the magnesium oxide is present in the dry mix in an amount of about 80 to about 120 percent of the weight of the solid orthophosphate.

\* \* \* \* \*